(12) United States Patent
Zhang

(10) Patent No.: US 10,426,011 B1
(45) Date of Patent: Sep. 24, 2019

(54) FUNCTIONALLY INTEGRATED INDUCTION LAMP

(71) Applicant: Zhongshan Winstar Electrical Co., Ltd., Zhongshan, Guangdong (CN)

(72) Inventor: Baohua Zhang, Guangdong (CN)

(73) Assignee: Zhongshan Winstar Electrical Co., Ltd., Zhongshan (CN)

( * ) Notice: Subject to any disclaimer, the term of this patent is extended or adjusted under 35 U.S.C. 154(b) by 0 days.

(21) Appl. No.: 16/102,707

(22) Filed: Aug. 13, 2018

(30) Foreign Application Priority Data

May 4, 2018 (CN) .................... 2018 2 0668094 U

(51) Int. Cl.
  *H05B 33/08* (2006.01)
  *F21L 4/02* (2006.01)
(52) U.S. Cl.
  CPC .......... *H05B 33/0854* (2013.01); *F21L 4/027* (2013.01)
(58) Field of Classification Search
  CPC ............. H05B 33/0854; G02B 6/0021; G02B 6/0026; G02B 6/0033; G02B 6/0035; G02B 6/0055; G02B 6/0088; G02B 6/0083; G02B 6/0093; G02B 6/0095; G02B 6/0096; F21L 4/027; F21L 4/02; F21L 4/08; F21W 213/3005; F21W 2131/3005; F21Y 2115/10
  See application file for complete search history.

(56) References Cited

U.S. PATENT DOCUMENTS

| | | | |
|---|---|---|---|
| 2016/0224064 A1* | 8/2016 | Fleisig | .................. G06F 1/1632 |
| 2017/0328765 A1* | 11/2017 | Jonsson | .................. G01J 1/029 |
| 2017/0363276 A1* | 12/2017 | Chien | .................. F21V 7/0008 |

FOREIGN PATENT DOCUMENTS

CN 205782299 U * 12/2016 ................ F21L 4/02

* cited by examiner

*Primary Examiner* — Wei (Victor) Y Chan
*Assistant Examiner* — Henry Luong

(57) ABSTRACT

The present invention discloses a functionally integrated induction lamp comprising a bottom case and a top case. A PCB having a light control circuit is arranged therebetween, which is provided with an induction sensor for detecting moving objects or ambient light signals to trigger the induction LED lamp for emitting light and an induction LED lamp connected to the circuit. A light guide plate enabling the light emitted by the induction LED lamp to come out and a sensor shield are arranged on the top case. An outer surface of the sensor shield is connected transitionally to an outer surface of the light guide plate smoothly to form a curved surface, which can greatly improve its appearance. Meanwhile, the sensor shield is a Fresnel lens with a smooth outer surface and an inner surface having concave and convex texture, greatly improving the induction to moving human bodies.

9 Claims, 5 Drawing Sheets

FUNCTIONALLY INTEGRATED INDUCTION LAMP

CROSS REFERENCE TO RELATED APPLICATIONS

The present application claims the benefit of Chinese Patent Application No. 201820668094.3 filed on May 4, 2018. All the above are hereby incorporated by reference.

TECHNICAL FIELD OF THE INVENTION

The present invention relates to a functionally integrated induction lamp.

BACKGROUND OF THE INVENTION

The existing induction lamps do not induce moving objects accurately and cannot immediately activate the induction LED lamps to provide illumination when people pass. Most of the existing induction lamps are not arranged on a same plane with the induction LED lamps and need separate mounting seats to fix the induction sensors, resulting in a complicated structure of the induction lamp. Some induction sensors are arranged on a same plane of the induction lamps with the induction LED lamps, but the connecting location between the induction sensor and the light guide plate of the induction LED lamp is not flat and regular, affecting appearance and also likely causing deviation of the mounting angle of the light guide plate, affecting the range of illumination. On the other hand, the existing induction lamps cannot work unless it is connected to a power supply.

SUMMARY OF THE INVENTION

The present invention overcomes the defects of the prior art and provides a functionally integrated induction lamp, wherein the induction sensor and the induction lamp are arranged on a same plane, and the outer surface of the sensor shield is transitionally connected to the outer surface of the light guide plate of the induction lamp smoothly to form a curved surface, greatly improving aesthetics. At the same time, the sensor shield is a Fresnel lens with a smooth outer surface and an inner surface that has concave and convex texture, which greatly improves the induction to moving human bodies.

To realize the foregoing object, the present invention provides a functionally integrated induction lamp, comprising a bottom case and a top case configured to be fitted with the bottom case; a PCB having a light control circuit arranged between the bottom case and the top case, which is provided with an induction sensor and at least one induction LED lamp connected to the light control circuit; wherein the induction sensor is configured to detect moving objects or ambient light signals to trigger the induction LED lamp to emit light, and the top case is provided with a light guide plate enabling the light emitted by the induction LED lamp to come out and a sensor shield, an outer surface of the sensor shield is connected transitionally to an outer surface of the light guide plate smoothly to form a curved surface.

According to the functionally integrated induction lamp of the invention, the induction sensor is a PIR sensor, the sensor shield is a Fresnel lens with a smooth outer surface and an inner surface having concave and convex texture, and the outer surface of the sensor shield and the outer surface of the light guide plate have a same curvature.

A sensor connecting seat is arranged on the top case. A groove is arranged on the sensor connecting seat. A decorative element is clamped on the top case. The lower side of the sensor connecting seat laps and presses on the upper side of the decorative element. The lower side of the sensor shield is snapped into the decorative element. The decorative element presses on the upper side of the light guide plate.

The bottom of the sensor connecting seat is provided with a fixing column that extends toward the bottom case. The fixing column is connected to the bottom case by bolts in a fixed manner.

According to the functionally integrated induction lamp of the invention, an LED flashlight module connected to the light control circuit which is connected to a switch key for controlling the illumination of the LED flashlight module and a toggle key for controlling the ON and OFF of the induction LED lamp is arranged between the bottom case and the top case; and a battery for supplying power to the LED flashlight module or the induction LED lamp is arranged on the bottom case.

Preferably, the battery is a rechargeable battery.

Preferably, a power adapter connected to a power control circuit for converting utility power is arranged on the bottom case, and a power plug connected to the power adapter is arranged on the bottom case.

Preferably, a power plug can stretch out or be turned over and folded in a recess.

Further, the functionally integrated induction lamp provided by the present invention comprises a USB interface located between the bottom case and the top case, which is connected to the power control circuit for supplying power to external electronic devices.

Preferably, the LED flashlight module comprises a flashlight LED lamp connected to a reflective cup covered by a light transmissive plate.

The beneficial effects of the present invention:

1. The present invention arranges an induction sensor and an induction lamp on a same plane, and detects human bodies in a front side, which can simplify the structure and improve detection accuracy. Meanwhile, the outer surface of the sensor shield is smoothly connected to the outer surface of the light guide plate of the induction lamp transitionally to form a curved surface to make it concise and good looking.
2. The sensor shield of the present invention is a Fresnel lens with a smooth outer surface and an inner surface that has concave and convex texture, which greatly improves the induction to moving human bodies.
3. The present invention has a built-in rechargeable battery and can still work in case of power failure, so the installation position is not limited to the range of wiring. Meanwhile, a concealed power plug is built in and the rechargeable battery may be charged directly via the power plug without the need of an external power adapter.
4. The present invention is provided with an LED flashlight module for flashlight. A USB interface is also provided, which may be used as a mobile charger to charge electronic products. Further, the product of the present invention has a small volume, allowing convenient portability.

DETAILED DESCRIPTION OF THE INVENTION

Figure 1:
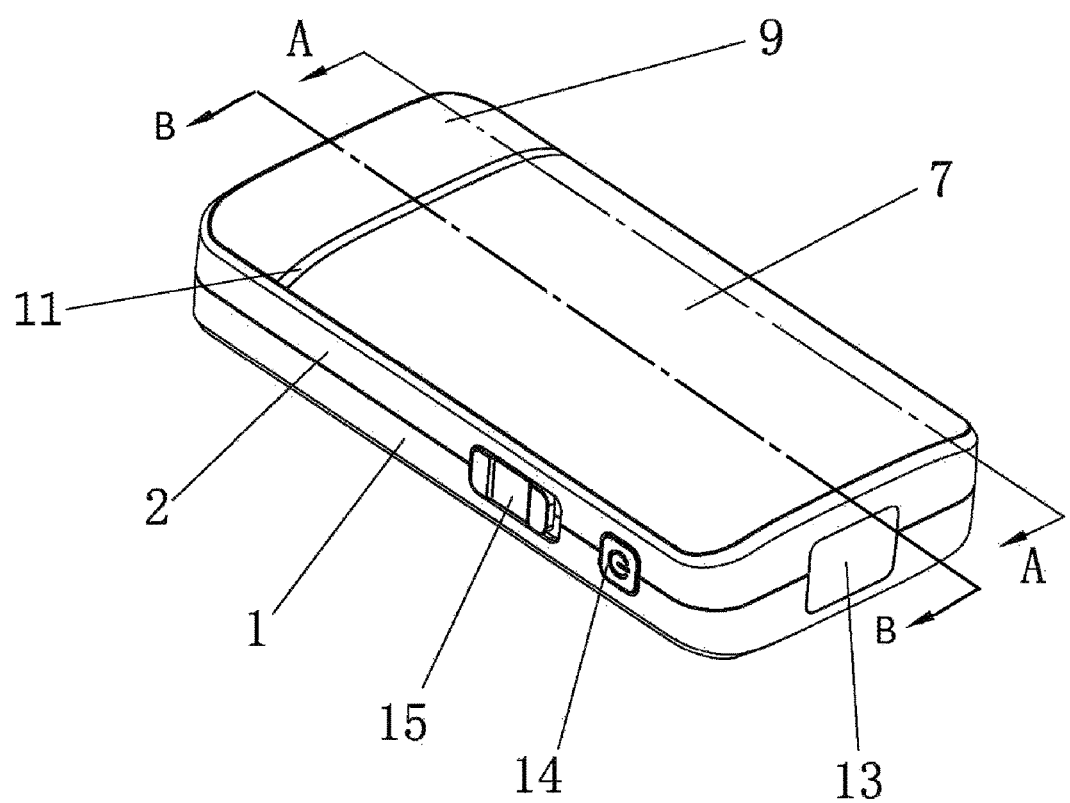
FIG. 1 is a schematic view of the present invention.
Figure 2:
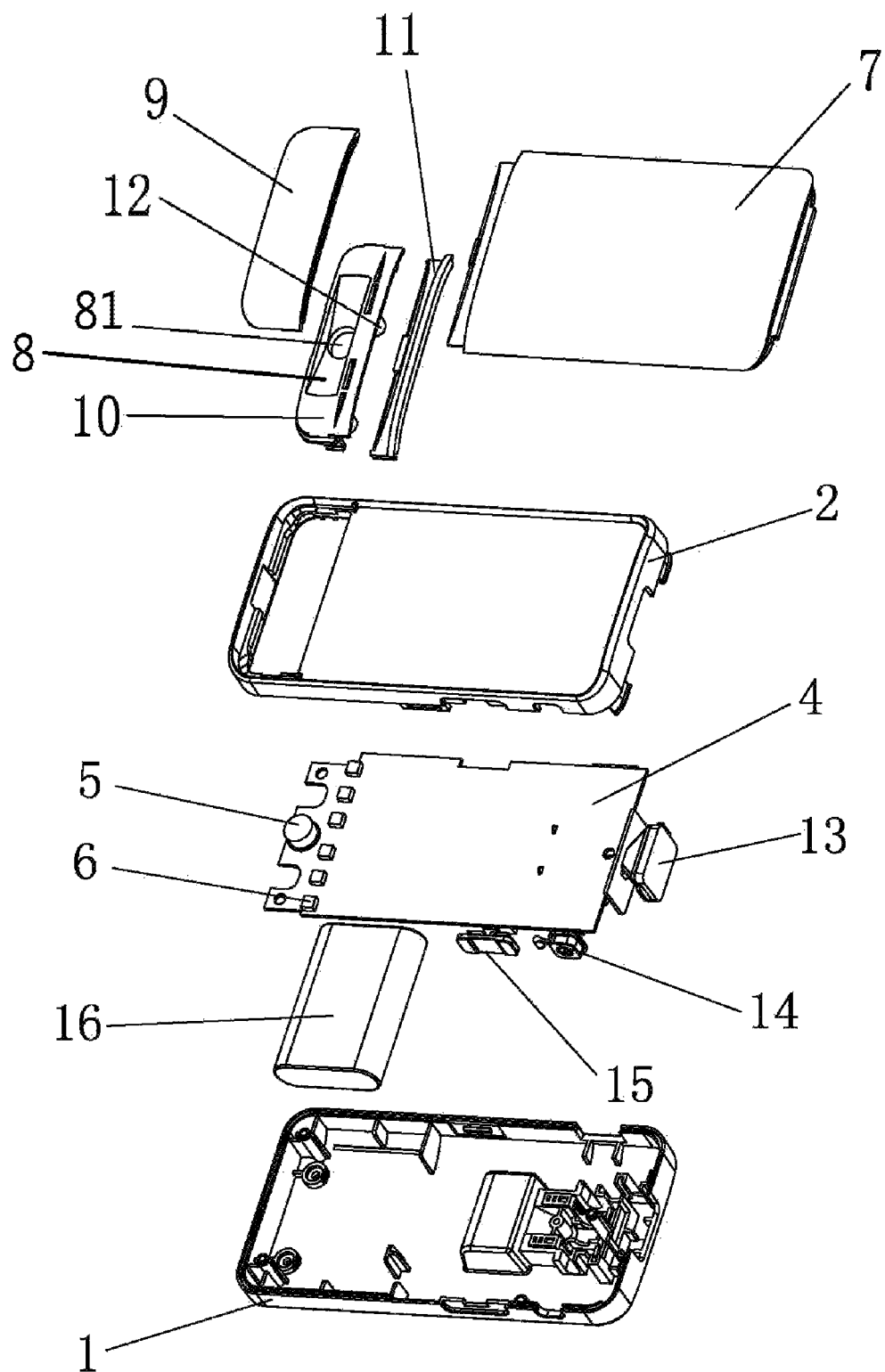
FIG. 2 is exploded view 1 of the present invention.
Figure 3:
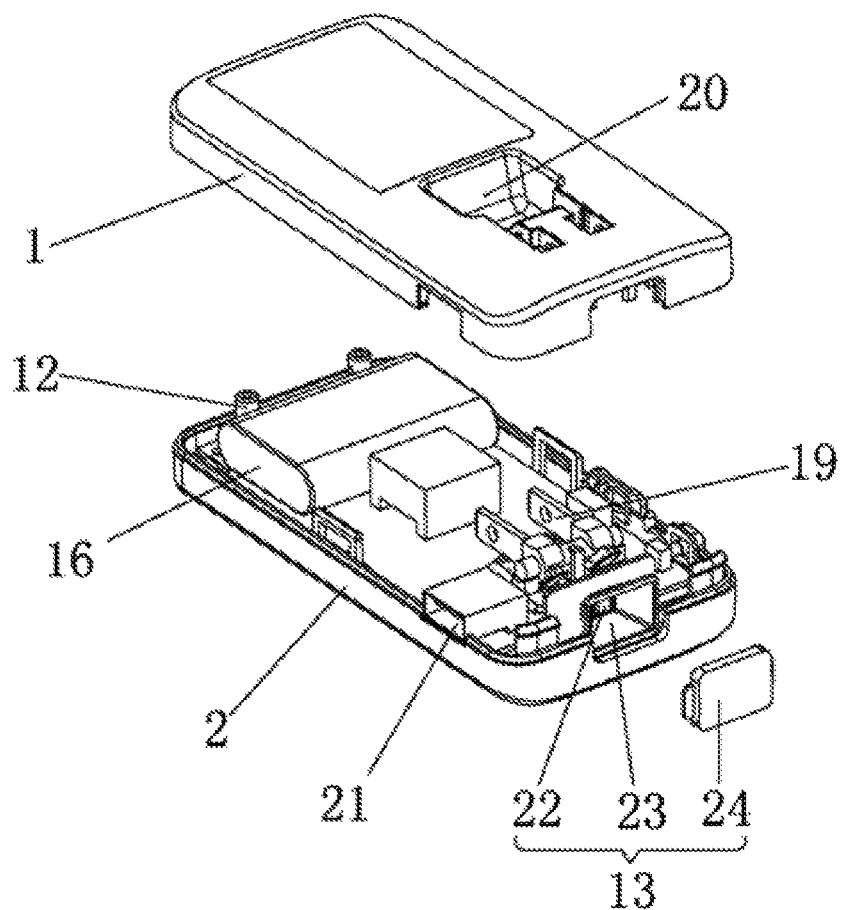
FIG. 3 is exploded view 2 of the present invention.

Below the present invention will be further described by referring to the accompanying drawings and embodiments.

As shown in FIG. 1-FIG. 8, the present invention provides a functionally integrated induction lamp, which comprises a bottom case 1 and a top case 2 configured to be fitted with the bottom case 1. A PCB 4 having a light control circuit 3 is arranged between the bottom case and the top case, and provided with an induction sensor 5 and at least one induction LED lamp 6 connected to the light control circuit 3. The induction sensor 5 is configured to detect moving objects or ambient light signals to trigger the induction LED lamp 6 to emit light.

A light guide plate 7 enabling the light emitted by the induction LED lamp 6 to come out and a sensor shield 9 for covering and protecting the induction sensor 5 are arranged on the top case 2. They jointly form the surface layer of the top case 2. The outer surfaces of the light guide plate 7 and the sensor shield 9 are smoothly connected transitionally to form a curved surface. That is to say, the outer surface of the sensor shield 9 and the outer surface of the light guide plate 7 have a same curvature, thereby greatly improving product appearance. Meanwhile, the induction sensor 5 and the induction LED lamp 6 are arranged on a same plane. The induction sensor 5 can more effectively detect the movement of objects in the front side, thereby allowing more accurate detection. The induction sensor is mounted inside the sensor shield 9 in a concealed manner to achieve smooth transition and connection between the surface of the sensor shield 9 and the surface of the light guide plate, which makes it more integral, concise and good-looking and meanwhile avoids the problems such as dirtiness or scratches of the detection window of the induction sensor, particularly when it is carried along, thereby ensuring reliable and stable operation of the induction sensor and showing desirable detection sensitivity.

The induction sensor 5 is a PIR sensor. The sensor shield 9 is a Fresnel lens with a smooth outer surface and an inner surface that has concave and convex texture. The concave and convex texture may be concentric texture or fingerprint texture.

During operation, when a moving object or a human body passes the sensor shield 9, i.e., the Fresnel lens, the concave and convex texture on the inner surface refracts and reflects the pyroelectric infrared signal of the object or human body onto the induction sensor 5. The light control circuit 3 controls the induction LED lamp 6 to emit light after receiving the sensing signal. The light of the induction LED lamp 6 is scattered outward via the light guide plate 7 for illumination As shown in FIG. 2~FIG. 7, the top case 2 further comprises a sensor connecting seat 10 under the sensor shield 9. A groove 8 is arranged on the sensor connecting seat 10. At the bottom of the groove 8, a through-hole 81 allowing passage of one end of the induction sensor 5 is arranged to fix the induction sensor 5 and keep its detection direction. Arc concave surfaces are designed on the two sides of the groove 8 that are adjacent to the through-hole 81 so that the detection range of the induction sensor 5 can be increased.

In this embodiment, a plurality of induction LED lamps 6 is arranged on PCB 4, which is configured to form a line and be located near the induction sensor 5. A space for receiving the sensor connecting seat 10 and a plurality of the induction LED lamps 6 is created at one end of the top case 2.

The top case 2 further comprises a decorative element 11, which is between the light guide plate 7 and the sensor connecting seat 10 and over a plurality of induction LED lamps 6. The cross section of the decorative element 11 is shaped substantially as "⌐" and its inner surface has reflective coating to refract and spread the light emitted by the induction LED lamps 6 to the light guide plate 7. As shown in FIG. 4~FIG. 7, the decorative element 11 comprises a body 110 and a flange 112 extending upwards from one side of the body 110. The body 110 is configured to match with the connecting position of the light guide plate 7 and the sensor connecting seat 10. Thus, the body 110, the light guide plate 7 and the sensor connecting seat 10 are configured structurally as follows: a side of the sensor connecting seat 10 facing the light guide plate 7 is fit with the outer side of the decorative element 11, while the inner side of the decorative element 11 is articulated with a protruding part arranged at one end of the light guide 7 so that a plurality of the induction LED lamps 6 is just under the foresaid two components and consequently the light emitted by the induction LED lamps 6 is refracted to the light guide plate 7 via the decorative element 11 and then disperses outwards. The flange 12 of the decorative element 11 is between the sensor shield 9 and the light guide plate 7 and its outer surface is smoothly connected with the outer surfaces of the sensor shield 9 and the light guide plate 7 transitionally, which may play a decorative role.

The light guide plate 7, the sensor shield 9, the sensor connecting seat 10 and the decorative element 11 are connected and fixed to the top case 2 in a buckled manner. They fit each other tightly and can be easily assembled and disassembled, allowing for a simple structure and high-efficient assembly.

Figure 4:
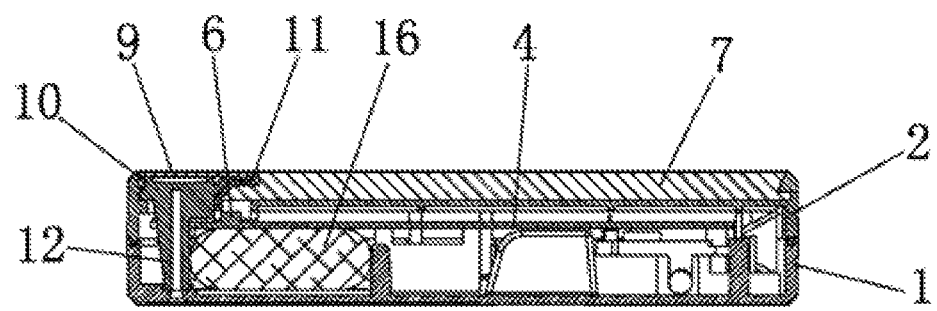
FIG. 4 is a section view taken along line A-A of FIG. 1.
Figure 5:
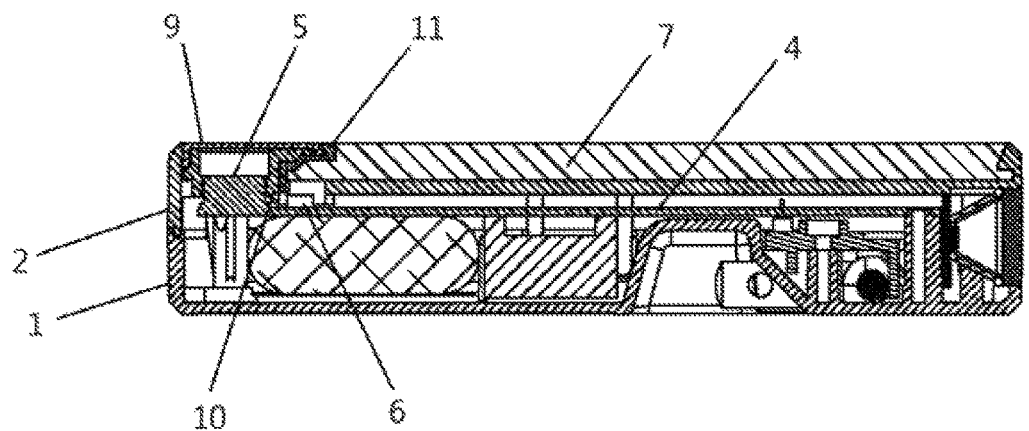
FIG. 5 is a section view taken along line B-B of FIG. 1.
Figure 6:
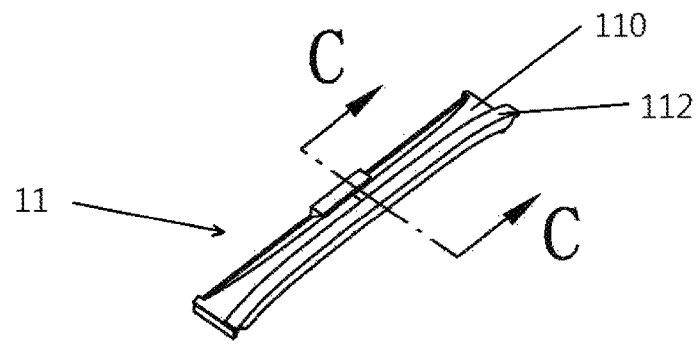
FIG. 6 is a structural schematic view of the decorative element shown in FIG. 1.
Figure 7:
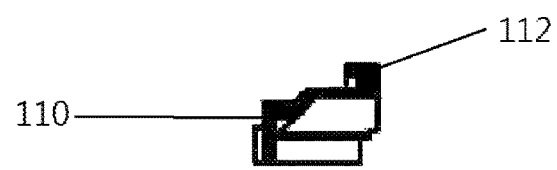
FIG. 7 is a section view taken along line C-C of FIG. 6.
Figure 8:
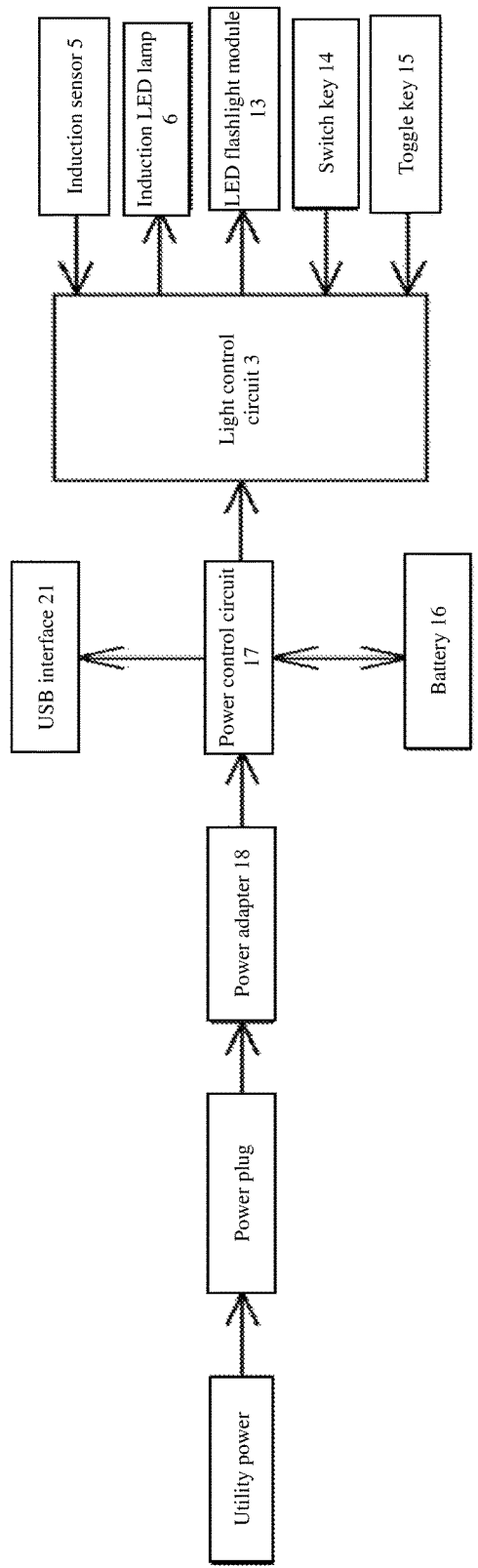
FIG. 8 is a structural schematic view of the circuits of the present invention.

Further, as shown in FIG. 4, the bottom of the sensor connecting seat 10 is provided with a fixing column 12 extending towards the bottom case 1. The fixing column 12 is connected fixedly to the bottom case 1 by bolts.

An LED flashlight module 13 connected to the light control circuit 3 is arranged between the bottom case 1 and the top case 2. The light control circuit 3 is connected to a switch key 14 for controlling the illumination of the LED flashlight module 13, and a toggle key 15 for controlling the ON and OFF of the induction LED lamp 6. The LED flashlight module 13 comprises a flashlight LED lamp 22 connected to a reflective cup 23 with which a light transmissive plate 24 is covered. Via the switch key 14, the illumination of the LED flashlight module 13 is controlled and used as a flashlight. Via the toggle key 15, the induction LED lamp 6 can be switched to an induction lighting mode, or to a constantly-on lighting mode.

The present invention further comprises a USB interface 21 that is located between the bottom case 1 and the top case 2. The USB interface 21 is connected to the power control circuit 17 for supplying power to external electronic devices. Therefore, during outing, the product of the present invention may be used as a mobile charger to charge electronic products in case of shortage of electricity.

A battery 16 for supplying power to the LED flashlight module 13 or the induction LED lamp 6 is arranged on the bottom case 1. The battery 16 is preferably a rechargeable battery and can still work in case of power failure, so that the installation position is not limited to the range of wiring, thereby enlarging the use scope and facilitating usage of different environments.

A power adapter 18 connected to power control circuit 17 for converting utility power is arranged on the bottom case 1. A power plug 19 connected to the power adapter 18 is arranged on the bottom case 1. The power plug 19 can stretch out or be turned over and folded in a recess 20, rendering no need of external power adapter, simplicity and convenience of charging. Meanwhile, the concealed and foldable power plug 19 improves the appearance and convenient portability.

When the present invention is used conventionally, it is connected to a corresponding socket via a power plug, and enabled the function of induction lighting, subsequently the battery is charged fully. When the induction sensor induces a moving object or a human body, the induction LED lamp can be triggered to switch on, and the utility power will directly supply power to the induction LED lamp through corresponding conversion. When the induction sensor no longer induces the moving objects or human body, the induction LED lamp will enter a state of delayed OFF. In the use process, if the utility power is failed, the battery will serve as a power supply and supply power to the electronic elements inside the present invention. Therefore, in addition of the function of induction lighting, the present invention also has a function of emergency lighting.

When the present invention is carried along and used, the battery is directly used as a power supply. The user may selectively use the functions, including the function of induction lighting, the function of flashlight lighting and the function of charging.

To sum up, the present invention integrates multiple functions, may be applied in different environments and is user friendly and reliable.

The invention claimed is:

1. A functionally integrated sensor lamp, comprising:
   a bottom case;
   a top case configured to be fitted with the bottom case;
   a PCB having a light control circuit arranged between the bottom case and the top case, which is provided with an induction sensor and at least one induction LED lamp connected to the light control circuit;
   wherein the induction sensor is configured to detect moving objects or ambient light signals to trigger the at least one induction LED lamp to emit light; and the top case is provided with a light guide plate enabling the light emitted by the at least one induction LED lamp to come out and a sensor shield covering the induction sensor, and an outer surface of the sensor shield is connected transitionally to an outer surface of the light guide plate smoothly to form a curved surface;
   wherein a sensor connecting seat is arranged on the top case, a groove is arranged on the sensor connecting seat for mounting the induction sensor and the sensor shield is mounted on the sensor connecting seat;
   wherein a decorative element with an inner surface having reflective coating is arranged on the top case and is between the sensor connecting seat and the light guide plate and over the at least one induction LED lamp.

2. The functionally integrated sensor lamp according to claim 1, wherein a bottom of the sensor connecting seat is provided with a fixing column extending toward the bottom case, the fixing column is connected to the bottom case by bolts in a fixed manner.

3. The functionally integrated sensor lamp according to claim 1, wherein an LED flashlight module connected to the light control circuit is arranged between the bottom case and the top case, the light control circuit is connected to a switch key for controlling illumination of the LED flashlight module and a toggle key for controlling ON and OFF of the at least one induction LED lamp; and a battery for supplying power to the LED flashlight module or the at least one induction LED lamp is arranged on the bottom case.

4. The functionally integrated sensor lamp according to claim 3, wherein the battery is a rechargeable battery.

5. The functionally integrated sensor lamp according to claim 1, wherein a power adapter connected to a power control circuit for converting utility power is arranged on the bottom case, and a power plug connected to the power adapter is arranged on the bottom case.

6. The functionally integrated sensor lamp according to claim 5, wherein the power plug can stretch out or be turned over and folded in a recess arranged on the bottom case.

7. The functionally integrated sensor lamp according to claim 3, wherein further comprising a USB interface located between the bottom case and the top case, which is connected to the power control circuit for supplying power to external electronic devices.

8. The functionally integrated sensor lamp according to claim 3, wherein the LED flashlight module comprises a flashlight LED lamp connected to a reflective cup covered by a light transmissive plate.

9. The functionally integrated sensor lamp according to claim 1, wherein the induction sensor is a PIR sensor, the sensor shield is a Fresnel lens; and the outer surface of the sensor shield and the outer surface of the light guide plate have a same curvature.

* * * * *